Apr. 17, 1923.                                                    1,451,731
R. W. HIGDON
PIPE JOINT
Filed June 24, 1921
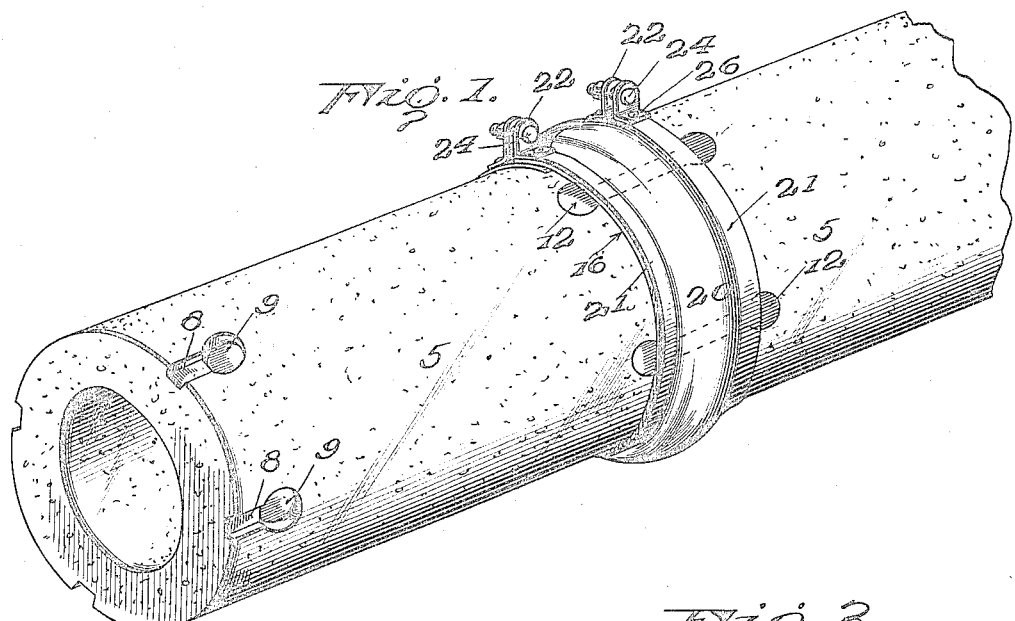
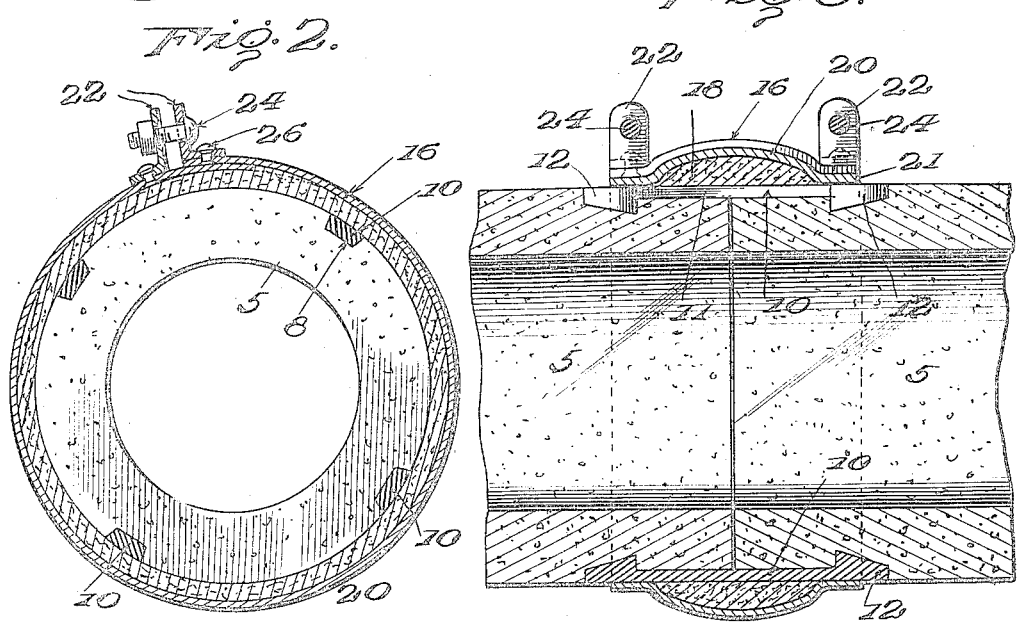
WITNESSES                                                        INVENTOR
                                                              R. W. Higdon.
                                                                   BY
                                                               ATTORNEYS Patented Apr. 17, 1923.                                                          1,451,731

UNITED STATES PATENT OFFICE.

ROBERT W. HIGDON, OF ATLANTA, GEORGIA.

PIPE JOINT.

Application filed June 24, 1921. Serial No. 480,023.

*To all whom it may concern:*

Be it known that I, ROBERT W. HIGDON, a citizen of the United States, and resident of Atlanta, in the county of Fulton and State of Georgia, have invented certain new and useful Improvements in Pipe Joints, of which the following is a specification.

This invention relates to pipe joints especially adapted for use in connection with cement, terra cotta and similar pipes.

Briefly stated an important object of this invention is to provide means for connecting the meeting ends of a pair of pipe sections in such a manner that the pipe sections are securely and permanently held in alignment.

A further object is to provide a pipe joint which utilizes cement in a more or less semi-fluid state to connect the pipe sections and to firmly hold the joining keys within the sockets or grooves provided for that purpose.

A further object is to provide a pipe joint which is simple to apply, efficient in use and cheap to manufacture.

Other objects and advantages of the invention will be apparent during the course of the following description.

In the accompanying drawing forming a part of this application and in which like numerals are employed to designate like parts throughout the same, Figure 1 is a fragmentary perspective of a pipe line embodying a plurality of sections connected by the improved pipe joint.

Figure 2 is a vertical transverse sectional view through the joint.

Figure 3 is a detail longitudinal sectional view through the meeting ends of two pipe sections, the view illustrating the means for joining the same.

Figure 4 is a perspective of a key embodied in the invention.

Broadly speaking the invention forming the subject matter of this application resides in providing simple means whereby the meeting ends of a plurality of pipe sections 5 may be securely connected and held in alignment. After the pipe line has been in use for a considerable length of time, the earth about the same settles at the pipe joints and as no positive means are provided for holding the sections in alignment the meeting ends of the pipes sag thereby permitting the escape of the fluid matter in the pipe. It is therefore an important object to provide simple and reliable means to hold the sections in alignment when the earth about the meeting ends of the sections sinks or settles.

In carrying out the invention the sections 5 are formed of cement, terra cotta or similar material and the form from which the sections are made are provided at their ends with series of inwardly extending projections which define longitudinally extending grooves 8 in the ends of the sections 5. One end of each groove 8 extends out through the end of the section while the other end terminates in a cylindrical socket 9 of a greater depth than the longitudinal groove 8 and having its bottom wall inclined.

When the sections are aligned as illustrated in Figure 3 a plurality of keys 10 are arranged in the registering grooves 8 and the enlarged sockets 9 of the same. Each key or coupling member 10 includes a straight shank 11 having its ends enlarged to provide disk-shaped heads 12 which are received within the cylindrical sockets 9 in the pipe sections. The bottom walls or faces of the enlarged heads 12 extend below the underside of the shank 11 and are inclined to correspond to the inclination of the bottom walls of the sockets 9. By extending the heads 12 below the under side of the shank 11 laterally projecting shoulders are formed at the ends of the shank, which shoulders contact with the inner walls of the sockets 9 and thereby hold the sections securely against longitudinal movement. Also the laterally projecting shoulders formed at the ends of the shanks 11 prevent the sections 5 from separating.

After the application of the keys 10 to the meeting portions of the sections a retaining band 16 is arranged about the pipe joint to hold the keys firmly in position and to hold an annular body of cement 18 about the pipe. As illustrated in Figures 1 and 3 the band 16 is struck outwardly intermediate its edges to form an annular hollow reinforcing rib 20 which receives the cement 18 when in a semi-fluid state. The outwardly extending hollow reinforcing rib 20 defines a pair of annular flanges 21 which contact with the outer sides of the pipe sections and the outer faces of the keys 10, which incidentally are flush with the outer face of the pipe sections. When the cement 18 dries or sets the same is intimately united with the cement sections 5 so that the three bodes of cement practically form one solid mass.

The end portions of the band 16 are provided with laterally projecting apertured ears 22 which receive fastening devices 24 in the nature of short bolts. With reference to Figure 3 it will be noted that the apertured ears 22 are secured by means of rivets 26 to the flanges 21. When the fastening devices 24 are tightened the ends of the band are overlapped and the band is drawn firmly about the pipe sections so that the annular body of cement which is in a semi-fluid state is firmly united with the sections 5. When set the cement 18 and the pipe sections 5 form one solid mass and the sections are therefore prevented from separating or sagging as a result of the earth about the sections sinking or settling.

In forming the sections 5 pieces of the keys 10 may be applied to the ends of the cement forms for providing the ends of the sections with the grooves 8 and 9. As the sides of the shanks 11 are beveled the side walls of the grooves 8 will also be beveled thereby facilitating the removal of the form from the completed cement section.

With reference to the foregoing description it will be seen that the band 16 not only serves as a means for securing the keys in position but as a means for pressing and holding the annular body 18 of cement in contact with the end portions of the sections 5. In use the keys 10 are of a substantial length so as to hold the sections together and are held within the grooves 8 and the sockets 9 by means of small quantities of cement poured into the grooves and sockets when joining the pipe sections.

When the band 16 rusts away as the result of long use the annular body of cement 18 firmly holds the sections in alignment and also holds the keys in position, which keys cooperate with the annular rib 18 in holding the sections in position.

I claim:—

1. The combination with a pair of pipe sections having their meeting ends formed with registering grooves, terminating in sockets of a greater depth than said grooves, of keys received in said grooves and having enlarged heads received in said sockets, the sides of said heads being engaged with the side walls of said sockets whereby to hold the ends of the sections in contact, and means surrounding said keys for holding the keys in position and for uniting said sections and consisting of an annular body of cement.

2. The combination with a pair of pipe sections having their meeting ends formed with registering grooves, terminating in sockets of a greater depth than said grooves, of keys received in said grooves and having enlarged heads received in said sockets, the sides of said heads being engaged with the side walls of said sockets whereby to hold the ends of the sections in contact, and means surrounding said keys for holding the keys in position and for uniting said sections and consisting of an annular body of cement, the bottom walls of said sockets and opposed faces of said heads being inclined.

3. The combination with a pair of pipe sections, of keys embedded in the meeting ends of said sections and having their outer sides flush with the outer sides of said sections, and an annular body of cement applied to the meeting ends of said sections to hold said keys in position and to intimately unite said sections.

4. The combination with a pair of pipe sections, of keys embedded in the meeting ends of said sections and having their outer sides flush with the outer sides of said sections, and an annular body of cement applied to the meeting ends of said sections to hold said keys in position and to intimately unite said sections, said keys being provided at their ends with enlarged heads defining shoulders holding the sections against separation.

5. The combination with a pair of pipe sections, of keys embedded in the meeting ends of said sections and having their outer sides flush with the outer sides of said sections, and an annular body of cement applied to the meeting ends of said sections to hold said keys in position and to intimately unite said sections, and a band surrounding said annular body of cement to hold the cement firmly in contact with said sections and to hold the keys in position.

6. The combination with a pair of cement pipe sections having their ends formed with longitudinally extending grooves opening out through the outer sides of the sections and terminating in enlarged sockets of a greater depth than said grooves thereby defining shoulders, of keys having shanks received in said grooves and having their ends formed with heads extending below the under sides of said shanks thereby defining shoulders cooperating with said first named shoulders in holding the sections against separation, an annular body of cement surrounding the meeting ends of said sections, a band having an outwardly extending hollow reinforcing rib receiving said annular body of cement and having flanges flatly contacting with said pipe sections and the heads of said keys, and means to secure said band firmly in engagement with said annular body, the ends of said band being overlapped.

ROBERT W. HIGDON.